United States Patent
Osugi et al.

(10) Patent No.: US 12,026,472 B2
(45) Date of Patent: Jul. 2, 2024

(54) DIALOGUE PROCESSING APPARATUS, LEARNING APPARATUS, DIALOGUE PROCESSING METHOD, LEARNING METHOD AND PROGRAM

(71) Applicant: NIPPON TELEGRAPH AND TELEPHONE CORPORATION, Tokyo (JP)

(72) Inventors: Yasuhito Osugi, Tokyo (JP); Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 308 days.

(21) Appl. No.: 17/613,417

(22) PCT Filed: May 28, 2019

(86) PCT No.: PCT/JP2019/021142
§ 371 (c)(1),
(2) Date: Nov. 22, 2021

(87) PCT Pub. No.: WO2020/240709
PCT Pub. Date: Dec. 3, 2020

(65) Prior Publication Data
US 2022/0229997 A1    Jul. 21, 2022

(51) Int. Cl.
G06F 40/35    (2020.01)
G06F 40/56    (2020.01)
G06V 30/41    (2022.01)

(52) U.S. Cl.
CPC ............. *G06F 40/35* (2020.01); *G06F 40/56* (2020.01); *G06V 30/41* (2022.01)

(58) Field of Classification Search
CPC ................................ G06F 40/35; G06V 30/41
See application file for complete search history.

(56) References Cited

U.S. PATENT DOCUMENTS

| | | | |
|---|---|---|---|
| 2019/0278812 A1* | 9/2019 | Otsuka | G06F 16/00 |
| 2021/0232948 A1* | 7/2021 | Otsuka | G06N 3/047 |

OTHER PUBLICATIONS

Huang et al. (2019) "FlowQA Grasping Flow in History for Conversational Machine Comprehension", Published as a conference paper at ICLR 2019, arXiv preprint arXiv: 1810.06683.

(Continued)

*Primary Examiner* — Ibrahim Siddo (57) ABSTRACT

A generation unit that takes a question $Q_i$ that is a word sequence representing a current question in a dialogue, a document P used to generate an answer $A_i$ to the question $Q_i$, a question history $\{Q_{i-1}, \ldots, Q_{i-k}\}$ that is a set of word sequences representing k past questions, and an answer history $\{A_{i-1}, \ldots, A_{i-k}\}$ that is a set of word sequences representing answers to the k questions as inputs, and generates the answer $A_i$ by machine reading comprehension in an extractive mode or a generative mode using pre-trained model parameters is provided.

7 Claims, 5 Drawing Sheets

(56) References Cited

OTHER PUBLICATIONS

Devlin et al. (2019) "BERT: Pre-training of Deep Bidirectional Transformers for Language Understanding", arXiv preprint arXiv: 1810.04805.
Vaswani et al. (2017) "Attention is All You Need", arXiv preprint arXiv: 1706.03762.
Seo et al. (2017) "Bidirectional Attention Flow for Machine Comprehension", in ICLR.
See et al. (2017) "Get to the Point: Summarization with Pointer-generator Networks", in Proceedings of the 55th Annual Meeting of the Association for Computational Linguistics (vol. 1: Long Papers), pp. 1073-1083, Jul. 2017.
Choi et al. (2018) "QuAC: Question Answering in Context", in EMNLP. ArXiv: 1808.07036.

* cited by examiner

DIALOGUE PROCESSING APPARATUS, LEARNING APPARATUS, DIALOGUE PROCESSING METHOD, LEARNING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/021142, filed on 28 May 2019, the disclosure of which is hereby incorporated herein by reference in its entirety.

TECHNICAL FIELD

The present invention relates to a dialogue processing apparatus, a learning apparatus, a dialogue processing method, a learning method, and a program.

BACKGROUND ART

Research on machine reading comprehension has been actively conducted. Machine reading comprehension is a technique for taking a document and a question as inputs and generating an answer to the question from the document. As methods for generating answers by machine reading comprehension, there are two known modes, an "extractive mode" in which words are retrieved from a document to generate an answer and a "generative mode" in which an answer is generated also using words other than the words in the document. In general, it is known that the generative mode can generate more natural sentences as answers than the extractive mode.

The machine reading comprehension that has been actively studied is of a question-and-answer mode. That is, in the machine reading comprehension, even if a plurality of questions are input, these questions are treated independently and an answer is generated independently for each question. On the other hand, interactive machine reading comprehension where questions and answers alternate has also been studied in recent years.

Interactive machine reading comprehension is a technique for taking a document, a current question, a past question history, and a past answer history as inputs and generating an answer to the current question. Thus, in interactive machine reading comprehension, it is possible to generate an answer based on the content of a dialogue so far (that is, a question history and an answer history so far) while questions and answers alternate. For example, Non Patent Literature 1 describes a technique for outputting a start position and an end position of a range corresponding to an answer in a document as interactive machine reading comprehension for generating an answer to a current question in an extractive mode.

PRIOR ART DOCUMENT

Non Patent Document

Non Patent Literature 1: Hsin-Yuan Huang, Eunsol Choi, and Wen-tau Yih. Flowqa: Grasping Flow in History for Conversational Machine Comprehension. arXiv preprint arXiv: 1810.06683, 2018.

SUMMARY OF THE INVENTION

Problem to be Solved by the Invention

However, for example, in the interactive machine reading comprehension described in Non Patent Document 1, an answer cannot be generated in a generative mode because the answer is generated in an extractive mode. Thus, the interactive machine reading comprehension of the related art can be applied to only one of the extractive mode and the generative mode.

Embodiments of the present invention have been made in view of the above points and an object of the present invention is to implement interactive machine reading comprehension that can be applied to both an extractive mode and a generative mode.

Means for Solving the Problem

To achieve the above object, a dialogue processing apparatus according to an embodiment of the present invention includes a generation unit configured to take a question $Q_i$ that is a word sequence representing a current question in a dialogue, a document P used to generate an answer $A_i$ to the question $Q_i$, a question history $\{Q_{i-1}, \ldots, Q_{i-k}\}$ that is a set of word sequences representing k past questions, and an answer history $\{A_{i-1}, \ldots, A_{i-k}\}$ that is a set of word sequences representing answers to the k questions as inputs and to generate the answer $A_i$ by machine reading comprehension in an extractive mode or a generative mode using pre-trained model parameters.

Effects of the Invention

It is possible to implement interactive machine reading comprehension that can be applied to both the extractive mode and the generative mode.

DESCRIPTION OF EMBODIMENTS

An embodiment of the present invention (hereinafter also referred to as the "present embodiment") will be described below. In the present embodiment, a dialogue processing apparatus 10 that implements interactive machine reading comprehension applicable to both the extractive mode and the generative mode will be described. That is, the dialogue processing apparatus 10 that implements interactive machine reading comprehension by taking a document, a current question, a past question history, and a past answer history as inputs and generating an answer to the current question in an extractive mode or a generative mode will be described. A document may also be referred to as a "passage," "search target text," or the like.

Overall Configuration of Dialogue Processing Apparatus 10

Interactive machine reading comprehension uses a model implemented by neural networks to generate an answer to the current question. Thus, there are a "learning time" when model parameters are learned and an "inference time" when an answer to the current question is generated using the learned model parameters. The model parameters are stored, for example, in a storage device such as an auxiliary storage device.

Overall Configuration of Dialogue Processing Apparatus 10 during Inference

Figure 1:
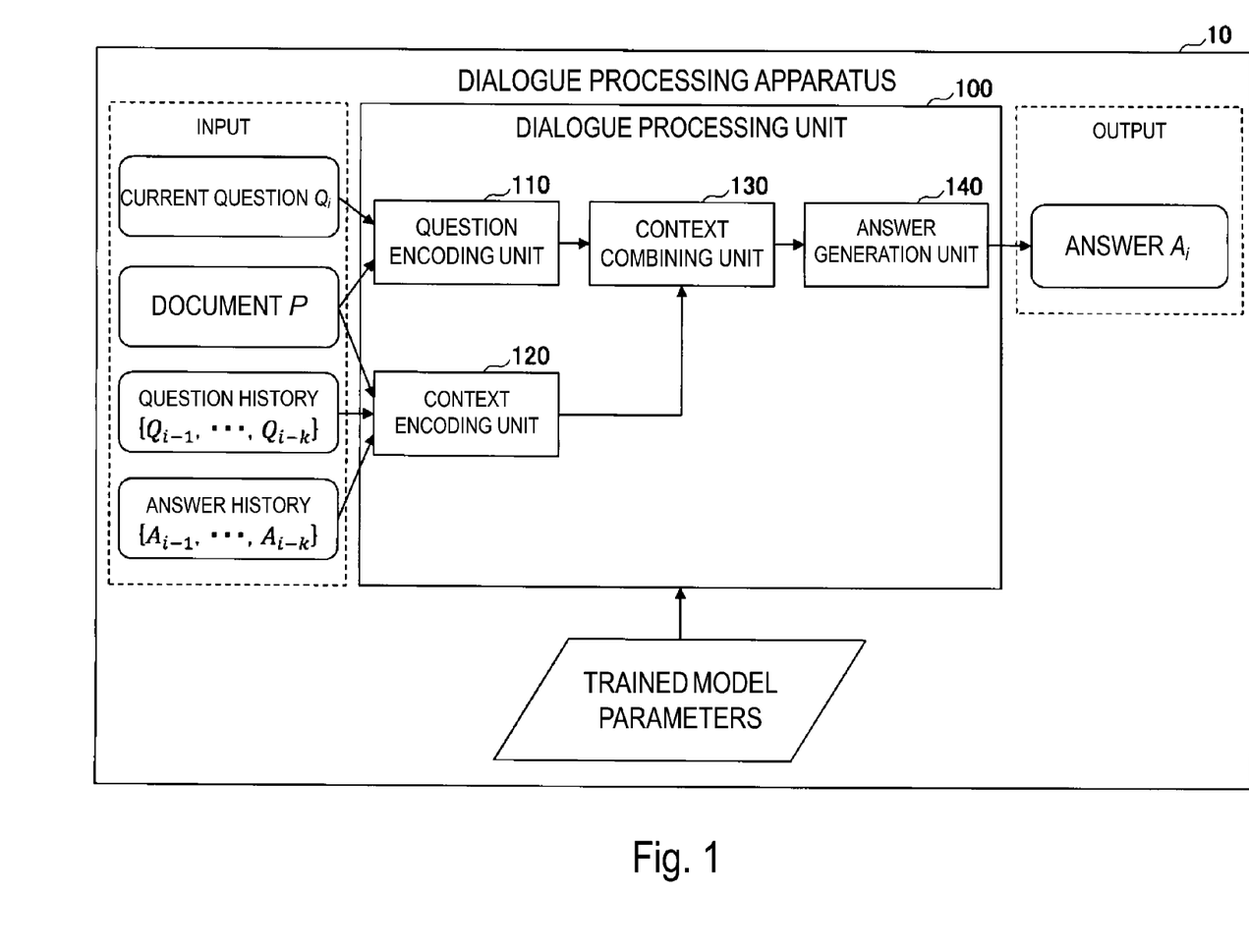
FIG. 1 is a diagram illustrating an example of an overall configuration of a dialogue processing apparatus (during inference) according to an embodiment of the present invention.

An overall configuration of the dialogue processing apparatus 10 for inference will be described with reference to FIG. 1. FIG. 1 is a diagram illustrating an example of the overall configuration of the dialogue processing apparatus 10 (during inference) according to the embodiment of the present invention.

As illustrated in FIG. 1, the dialogue processing apparatus 10 during inference includes a dialogue processing unit 100 as a functional unit. The dialogue processing unit 100 takes a current question $Q_i$, a document P, a question history $\{Q_{i-1}, \ldots, Q_{i-k}\}$, and an answer history $\{A_{i-1}, \ldots, A_{i-k}\}$ as inputs and generates an answer $A_i$ in an extractive mode or a generative mode using learned model parameters. Then, the dialogue processing unit 100 outputs the generated answer $A_i$. Here, i is an index indicating the number of the question (and the answer) in the dialogue and k is the number of past answer and question pairs that are taken into consideration as a history when generating the answer $A_i$ to the current question $Q_i$. For example, k is preset.

Each of the current question $Q_i$ and the past questions $Q_{i-1}, \ldots, Q_{i-k}$ is text including one or more words (that is, a character sequence). Similarly, each of the past answers $A_{i-1}, \ldots, A_{i-k}$ is text including one or more words. Similarly, the document P is text including one or more words. Hereinafter, the number of words included in the document P (that is, the length of the document P) will be denoted by T. However, T is not limited to the number of words included in the document P and may be, for example, the "sum of the number of words included in the document P and the number of special characters included therein." Examples of the special characters include characters representing the beginning of a sentence, characters representing the end of a sentence, characters used for padding, and characters used to combine words and sentences.

In the present embodiment, it is assumed that a single document P is input, although a document set including a plurality of documents may be input in the interactive machine reading comprehension. In the present embodiment, it is also assumed that the document P has a length of the number of words of about one paragraph (for example, about several hundred words).

As illustrated in FIG. 1, the dialogue processing unit 100 includes a question encoding unit 110, a context encoding unit 120, a context combining unit 130, and an answer generation unit 140. Each of these functional units is implemented by one or more neural networks.

The question encoding unit 110 takes the document P and the current question $Q_i$ as inputs and calculates features $\{u_i^1, \ldots, u_i^T\}$ of the document P conditioned on the current question $Q_i$ using the learned model parameters (that is, encodes the current question $Q_i$). Here, $u_i^1, \ldots, u_i^T$ are d-dimensional vectors.

The context encoding unit 120 takes the document P, the question history $\{Q_{i-1}, \ldots, Q_{i-k}\}$ and the answer history $\{A_{i-1}, \ldots, A_{i-k}\}$ as inputs and calculates features $\{u_{i-1}^1, \ldots, u_{i-k}^1\}, \ldots, \{u_{i-1}^T, \ldots, u_{i-k}^T\}$ of the document P conditioned on the question history $\{Q_{i-1}, \ldots, Q_{i-k}\}$ and features $\{v_{i-1}^1, \ldots, v_{i-k}^1\}, \ldots, \{v_{i-1}^T, \ldots, v_{i-k}^T\}$ of the document P conditioned on the answer history $\{A_{i-1}, \ldots, A_{i-k}\}$ (that is, encodes the question history $\{Q_{i-1}, \ldots, Q_{i-k}\}$ and the answer history $\{A_{i-1}, \ldots, A_{i-k}\}$) using the learned model parameters. For $t=1, \ldots, T$, $u_{i-1}^t, \ldots, u_{i-k}^t$, $v_{i-1}^t, \ldots, v_{i-k}^t$ are d-dimensional vectors.

Here, for example, in the interactive machine reading comprehension described in Non Patent Document 1, each answer in the answer history is expressed by a pair of start and end positions of a range corresponding to the answer in the document, while each question in the question history is expressed in text. On the other hand, in the present embodiment, each answer in the answer history $\{A_{i-1}, \ldots, A_{i-k}\}$ and each question in the question history $\{Q_{i-1}, \ldots, Q_{i-k}\}$ are both expressed in text as described above. Therefore, in the present embodiment, the features $\{u_{i-1}^t, \ldots, u_{i-k}^t\}$ (where $t=1, \ldots, T$) of the document P regarding the question history and the features $\{v_{i-1}^t, \ldots, v_{i-k}^t\}$ (where $t=1, \ldots, T$) of the document P regarding the answer history are treated equivalently.

The context combining unit 130 takes the features $\{u_i^1, \ldots, u_i^T\}$ calculated by the question encoding unit 110 and the features $\{u_{i-1}^t, \ldots, u_{i-k}^t\}$ and $\{v_{i-1}^t, \ldots, v_{i-k}^t\}$ (where $t=1, \ldots, T$) calculated by the context encoding unit 120 as inputs and calculates features $o^t$ (where $t=1, \ldots, T$) using the learned model parameters. These features $o^t$ are $d \times (1+2k)$-dimensional vectors and are each a feature reflecting the current question $Q_i$, the question history $\{Q_{i-1}, \ldots, Q_{i-k}\}$, and the answer history $\{A_{i-1}, \ldots, A_{i-k}\}$.

The answer generation unit 140 takes the features $o^t$ (where $t=1, \ldots, T$) calculated by the context combining unit 130 as an input and generates an answer $A_i$ using the learned model parameters. At this time, the answer generation unit 140 generates the answer $A_i$ in an extractive mode or a generative mode as described later.

Overall Configuration of Dialogue Processing Apparatus 10 during Learning

Figure 2:
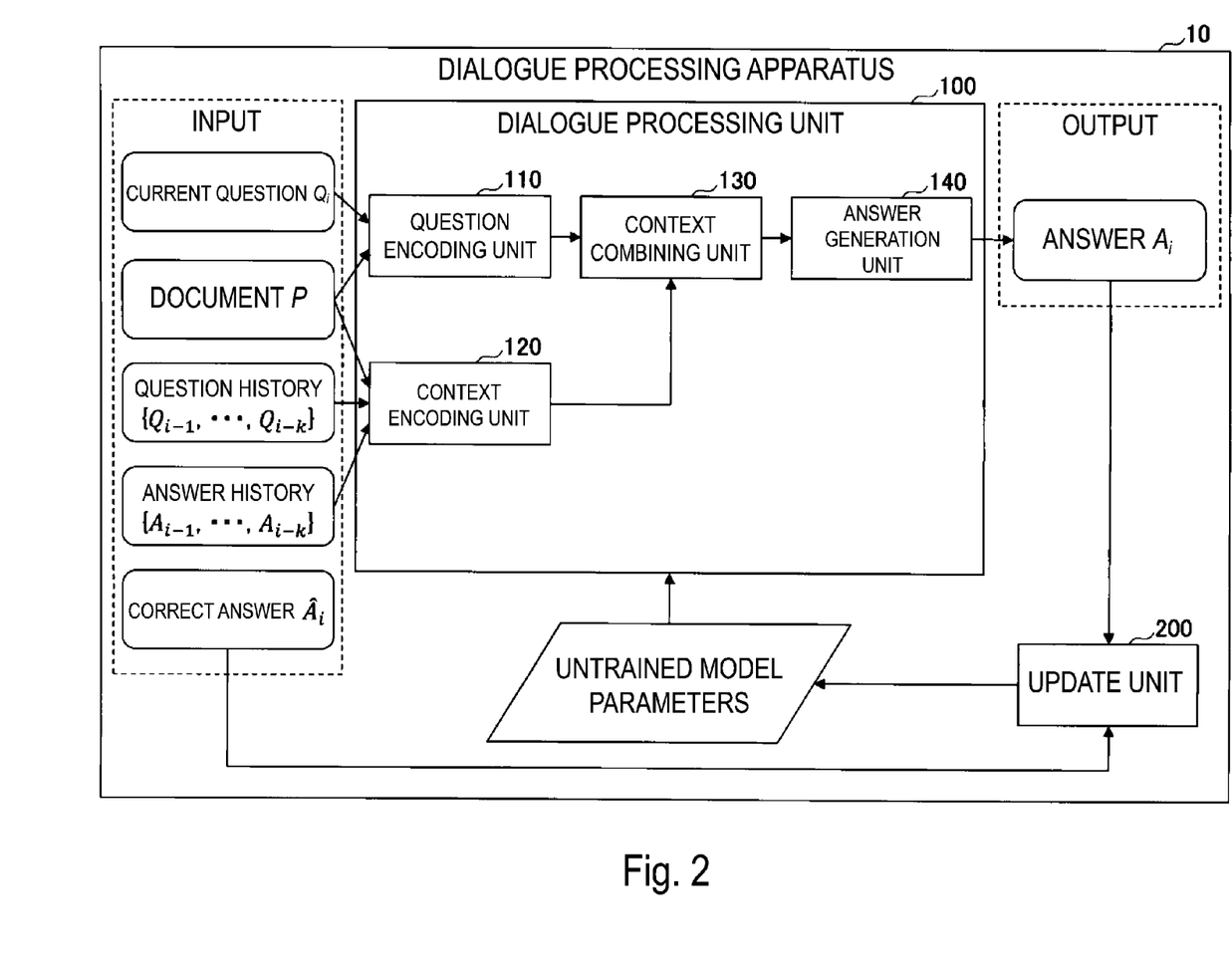
FIG. 2 is a diagram illustrating an example of an overall configuration of the dialogue processing apparatus (during learning) according to the embodiment of the present invention.

An overall configuration of the dialogue processing apparatus 10 during learning will be described with reference to FIG. 2. FIG. 2 is a diagram illustrating an example of the overall configuration of the dialogue processing apparatus 10 (during learning) according to the embodiment of the present invention.

As illustrated in FIG. 2, the dialogue processing apparatus 10 during learning includes a dialogue processing unit 100 and an update unit 200 as functional units. The dialogue processing unit 100 is similar to that for inference and thus description thereof will be omitted. However, during learning, the dialogue processing unit 100 generates an answer $A_i$ using untrained model parameters.

The update unit 200 takes a correct answer to the current question $Q_i$, which is represented by the following, and the answer $A_i$ generated by the dialogue processing unit 100 as inputs, and updates the model parameters using a supervised learning method.

$$\hat{A}_i \qquad \text{[Math. 1]}$$

Thereby, the model parameters are learned. In the following, the correct answer to the current question $Q_i$ will also be represented by "$\hat{A}_i$."

Dialogue Process

Figure 3:
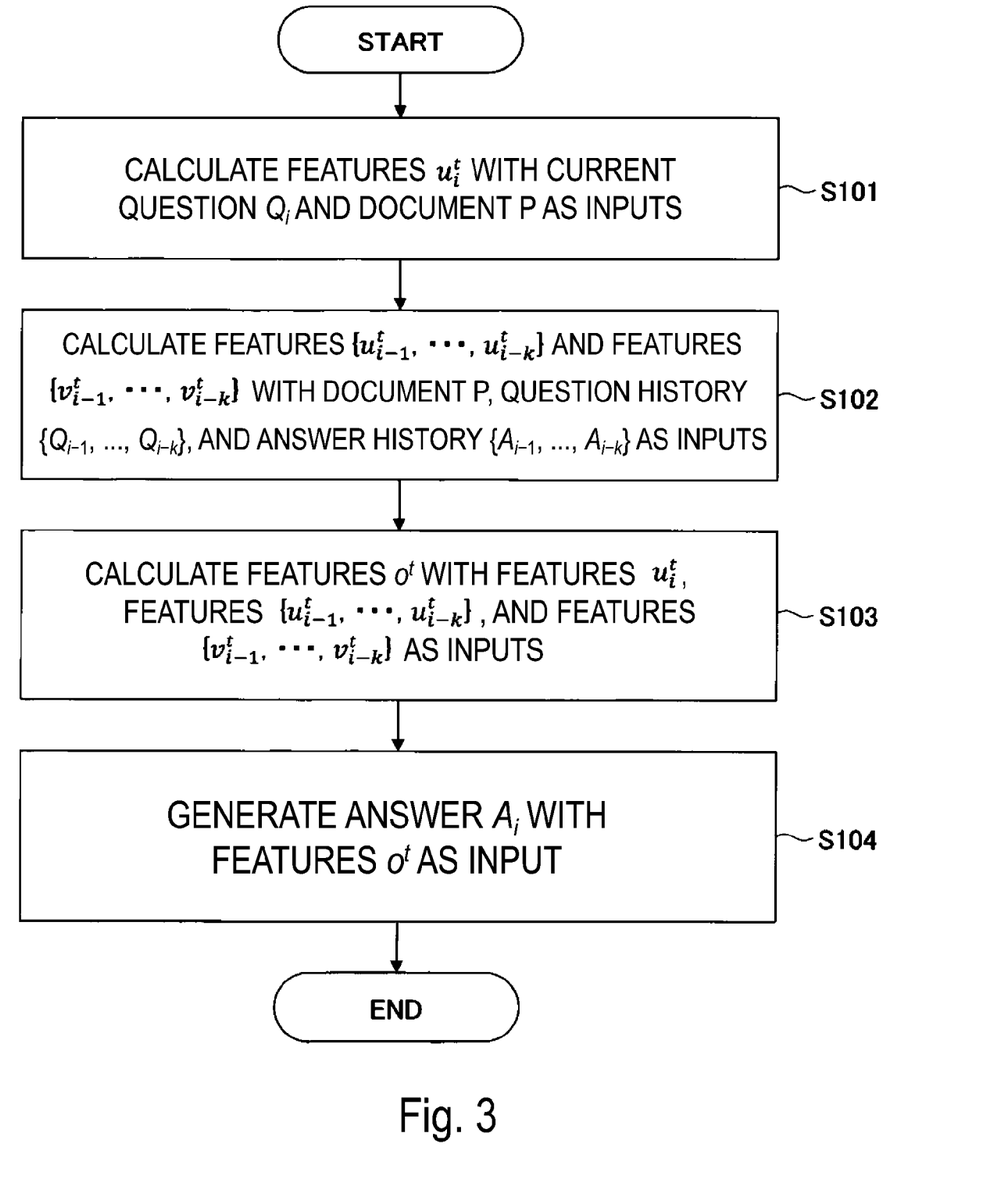
FIG. 3 it is a flowchart illustrating an example of a dialogue process according to the embodiment of the present invention.

In the following, a process for taking a current question $Q_i$, a document P, a question history $\{Q_{i-1}, \ldots, Q_{i-k}\}$, and an answer history $\{A_{i-1}, \ldots, A_{i-k}\}$ as inputs and generating an answer $A_i$ in an extractive mode or a generative mode using learned model parameters (a dialogue process) will be described with reference to FIG. 3. FIG. 3 is a flowchart illustrating an example of the dialogue process according to the embodiment of the present invention.

Step S101: The question encoding unit 110 takes the document P and the current question $Q_i$ as inputs and calculates features $u_i^t$ (where $t=1, \ldots, T$) of the document P conditioned on the current question $Q_i$ using the learned model parameters.

Here, for example, a model called Bidirectional Encoder Representations from Transformers (BERT) described in Reference 1 below can be employed as a model of a neural network that implements the question encoding unit 110.
Reference 1:

J. Devlin, M.-W. Chang, K. Lee, and K. Toutanova. Bert: Pre-training of Deep Bidirectional Transformers for Language Understanding. arXiv preprint arXiv: 1810.04805, 2018. The model of the neural network that implements the question encoding unit 110 may be an encoding model other than BERT. Use of a "model with knowledge for language understanding acquired by performing pre-learning using a Transformer model" such as the BERT can achieve higher accuracy. For the Transformer model, refer to Reference 2 below.
Reference 2

A. Vaswani, N. Shazeer, N. Parmar, and J. Uszkoreit. Attention is All You Need, arXiv preprint arXiv: 1706.03762, 2017. When theBERT described in Reference 1 above is employed as a model of the neural network that implements the question encoding unit 110, the question encoding unit 110 combines the document P and the current question $Q_i$ with a separator token [SEP] and inputs the combination to the model. Thereby, features $u_i^t$ (where $t=1, \ldots, T$) of the document P conditioned on the current question $Q_i$ are obtained.

The model of the neural network that implements the question encoding unit 110 is not limited to the BERT. Any model can be employed as a model of the neural network that implements the question encoding unit 110 as long as the model of the neural network is a model that takes a document P and a current question $Q_i$ as inputs and calculates features $u_i^t$ (where $t=1, \ldots, T$) of the document P conditioned on the current question Qi.

Step S102: The context encoding unit 120 takes the document P, the question history $\{Q_{i-1}, \ldots, Q_{i-k}\}$, and the answer history $\{A_{i-1}, \ldots, A_{i-k}\}$ as inputs and calculates features $\{u_{i-1}^t, \ldots, u_{i-k}^t\}$ (where $t=1, \ldots, T$) of the document P conditioned on the question history $\{Q_{i-1}, \ldots, Q_{i-k}\}$ and features $\{v_{i-1}^t, \ldots, v_{i-k}^t\}$ (where $t=1, \ldots, T$) of the document P conditioned on the answer history $\{A_{i-1}, \ldots, A_{i-k}\}$ using the learned model parameters.

Here, for example, the BERT described in Reference 1 above can be employed as a model of the neural network that implements the context encoding unit 120. When the BERT is employed as a model of the neural network that implements the context encoding unit 120, the context encoding unit 120 includes a model that encodes the question history $\{Q_{i-1}, \ldots, Q_{i-k}\}$ and a model that encodes the answer history $\{A_{i-1}, \ldots, A_{i-k}\}$. Thus, in this case, the context encoding unit 120 combines each question in the question history and the document P with a separator token [SEP] and inputs the combination to the model that encodes the question history $\{Q_{i-1}, \ldots, Q_{i-k}\}$. Similarly, the context encoding unit 120 combines each answer in the answer history and the document P with a separator token [SEP] and inputs the combination to the model that encodes the answer history $\{A_{i-1}, \ldots, A_{i-k}\}$.

The model of the neural network that implements the context encoding unit 120 may be an encoding model other than the BERT. Use of a "model with knowledge for language understanding acquired by performing pre-learning using a Transformer model" such as the BERT can achieve higher accuracy. For the Transformer model, refer to Reference 2 above.

More specifically, for example, when encoding a past question $Q_{i-j}$ (where $j \in \{1, \ldots, k\}$), the context encoding unit 120 combines the past question $Q_{i-j}$ and the document P with a separator token [SEP] and inputs the combination to the model that encodes the question history $\{Q_{i-1}, \ldots, Q_{i-k}\}$. Thereby, features $\{u_{i-j}^1, \ldots, u_{i-j}^T\}$ of the document P conditioned on the past question $Q_{i-j}$ are obtained.

Similarly, for example, when encoding a past answer $A_{i-j}$ (where $j \in \{1, \ldots, k\}$), the context encoding unit 120 combines the past answer $A_{i-j}$ and the document P with a separator token [SEP] and inputs the combination to the model that encodes the answer history $\{A_{i-1}, \ldots, A_{i-k}\}$. Thereby, features $\{v_{i-j}^1, \ldots, v_{i-j}^T\}$ of the document P conditioned on the past answers $A_{i-j}$ are obtained.

In this manner, features $\{u_{i-1}^t, \ldots, u_{i-k}^t\}$ (where $t=1, \ldots, T$) of the document P conditioned on the past questions $Q_{i-j}$ (where $j=1, \ldots, k$) and features $\{v_{i-1}^t, \ldots, v_{i-k}^t\}$ (where $t=1, \ldots, T$) of the document P conditioned on the past answers $A_{i-j}$ (where $j=1, \ldots, k$) are calculated.

The model of the neural network that implements the context encoding unit 120 is not limited to the BERT and any model can be employed as long as it is a model that takes a document P, a question history $\{Q_{i-1}, \ldots, Q_{i-k}\}$, and an answer history $\{A_{i-1}, \ldots, A_{i-k}\}$ as inputs and calculates features $\{u_{i-1}^t, \ldots, u_{i-k}^t\}$ (where $t=1, \ldots, T$) of the document P conditioned on the question history $\{Q_{i-1}, \ldots, Q_{i-k}\}$ and features $\{v_{i-1}^t, \ldots, v_{i-k}^t\}$ (where $t=1, \ldots, T$) of the document P conditioned on the answer history $\{A_{i-1}, \ldots, A_{i-k}\}$.

Step S103: The context combining unit 130 takes the features $\{u_i^1, \ldots, u_i^T\}$ calculated by the question encoding unit 110 and the features $\{u_i^1, \ldots, u_i^T\}$ and $\{v_{i-1}^t, \ldots, v_{i-k}^t\}$ (where $t=1, \ldots, T$) calculated by the context encoding unit 120 as inputs and calculates features $o^t$ (where $t=1, \ldots, T$) using the trained model parameters. Specifically, the context combining unit 130 calculates a feature $o^t$ for each $t=1, \ldots, T$ as $o^t = [u_i^t; u_{i-1}^t; \ldots; u_{i-k}^t; v_{i-1}^t; \ldots; v_{i-k}^t]$. Here, the operator ";" represents concatenation across dimension. As a result, features $o^t$ (where $t=1, \ldots, T$) are calculated. In this case, each feature $o^t$ (where $t=1, \ldots, T$) is a $d \times (1+2k)$-dimensional vector.

Here, any model can be employed as a model of the neural network that implements the context combining unit 130 as long as the model of the neural network is a model that can take the features $\{u_i^1, \ldots, u_i^T\}$ and the features $\{u_{i-1}^t, \ldots, u_{i-k}^t\}$ and $\{v_{i-1}^t, \ldots, v_{i-k}^t\}$ (where $t=1, \ldots, T$) as inputs and calculate features $o^t$ (where $t=1, \ldots, T$) that reflect the current question $Q_i$, the question history $\{Q_{i-1}, \ldots, Q_{i-k}\}$, and the answer history $\{A_{i-1}, \ldots, A_{i-k}\}$. Specifically, for example, a recurrent neural network (RNN) or the like can be employed.

However, the context combining unit 130 does not necessarily have to be implemented by a neural network. The context combining unit 130 may perform processing of combining uit, $\{u_{i-1}^t, \ldots, u_{i-k}^t\}$, and $\{v_{i-1}^t, \ldots, v_{i-k}^t\}$ using the operator ";" for each $t=1, \ldots, T$.

Step S104: The answer generation unit 140 takes the features $o^t$ (where t=1, ..., T) calculated by the context combining unit 130 as an input and generates an answer $A_i$ in an extractive mode or a generative mode using the trained model parameters.

(1) When answer $A_i$ is generated in extractive mode For example, a model called BiDirectional Attention Flow (BiDAF) described in Reference 3 below can be employed as a model of the natural network that implements the answer generation unit 140 when the answer $A_i$ is generated in the extractive mode. In this case, the answer generation unit 140 is implemented by a modeling layer and an output layer of BiDAF. Specifically, the answer generation unit 140 inputs the features $o^t$ (where t=1, ..., T) to the modeling layer of BiDAF described in Reference 3 and outputs the probability that each word in the document P is a start position of the answer $A_i$ and the probability that each word is an end position thereof as an output of the output layer. Then, the answer generation unit 140 estimates a range in the document P corresponding to the answer $A_i$ using a dynamic programming method based on these probabilities and then generates the answer $A_i$ by retrieving words in the range from the document P.

Reference 3:

Min Joon Seo, Aniruddha Kembhavi, Ali Farhadi, and Hannaneh Hajishirzi. Bidirectional Attention Flow for Machine Comprehension. In ICLR 2017.

The model of the neural network that implements the answer generation unit 140 when the answer $A_i$ is generated in an extractive mode is not limited to BiDAF. Any model can be employed as long as it is a model that takes features $o^t$ (where t=1, ..., T) as an input and generates an answer $A_i$ in the extractive mode.

(2) When answer $A_i$ is generated in generative mode For example, a model called a sequence-to-sequence attentional model described in Reference 4 below or a model called a pointer-generator can be employed as a model of the neural network that implements the answer generation unit 140 when the answer $A_i$ is generated in a generative mode. In this case, the answer generation unit 140 is implemented by an encoder and a decoder of the sequence-to-sequence attentional model or an encoder and a decoder of the pointer-generator. Specifically, the answer generation unit 140 inputs the features $o^t$ (where t=1, ..., T) to the encoder of the sequence-to-sequence attentional model or the pointer-generator described in Reference 4 and calculates probabilities that weight words of the document P (an attention distribution described in Reference 4). Then, the answer generation unit 140 inputs the probabilities to the decoder (the decoder of the sequence-to-sequence attentional model or the pointer-generator described in the decoder reference 4), and generates an answer $A_i$. At this time, the answer generation unit 140 generates the answer $A_i$ by coping words from the document P or generating words from a predetermined vocabulary set based on probabilities that weight words in the document P and probabilities that weight words in the predetermined vocabulary set (a vocabulary distribution described in Reference 4).

Reference Literature 4

Abigail See, Peter J. Liu, and Christopher D. Manning. Get to the Point: Summarization with Pointer-generator Networks. In Proceedings of the 55th Annual Meeting of the Association for Computational Linguistics (Volume 1: Long Papers), pp. 1073-1083, July 2017.

The model of the neural network that implements the answer generation unit 140 when the answer $A_i$ is generated in a generative mode is not limited to the sequence-to-sequence attentional model or the pointer-generator, and any model can be employed as long as it is a model that takes features $o^t$ (where t=1, ..., T) as an input and generates an answer $A_i$ in a generative mode.

The dialogue processing apparatus 10 according to the present embodiment can take the current question $Q_i$, the document P, the question history $\{Q_{i-1}, ..., Q_{i-k}\}$, and the answer history $\{A_{i-1}, ..., A_{i-k}\}$ as inputs and generate an answer $A_i$ in an extractive mode or a generative mode as described above. That is, the dialogue processing apparatus 10 according to the present embodiment can input the answer history $\{A_{i-1}, ..., A_{i-k}\}$ in which each past answer $A_{i-j}$ (where j=1, ..., k) is text and thus either a model that generates the answer $A_i$ in the extractive mode or a model that generates the answer $A_i$ in the generative mode can be employed as a model of the neural network that implements the answer generation unit 140.

Further, in the dialogue processing apparatus 10 according to the present embodiment, the features $\{u_{i-1}^t, ..., u_{i-k}^t\}$ (where t=1, ..., T) of the document P regarding the question history and the features $\{v_{i-1}^t, ..., v_{i-k}^t\}$ (where t=1, ..., T) of the document P regarding the answer history can be treated equivalently because both the question history $\{Q_{i-1}, ..., Q_{i-k}\}$ and the answer history $\{A_{i-1}, ..., A_{i-k}\}$ are text.

Learning Process

Figure 4:
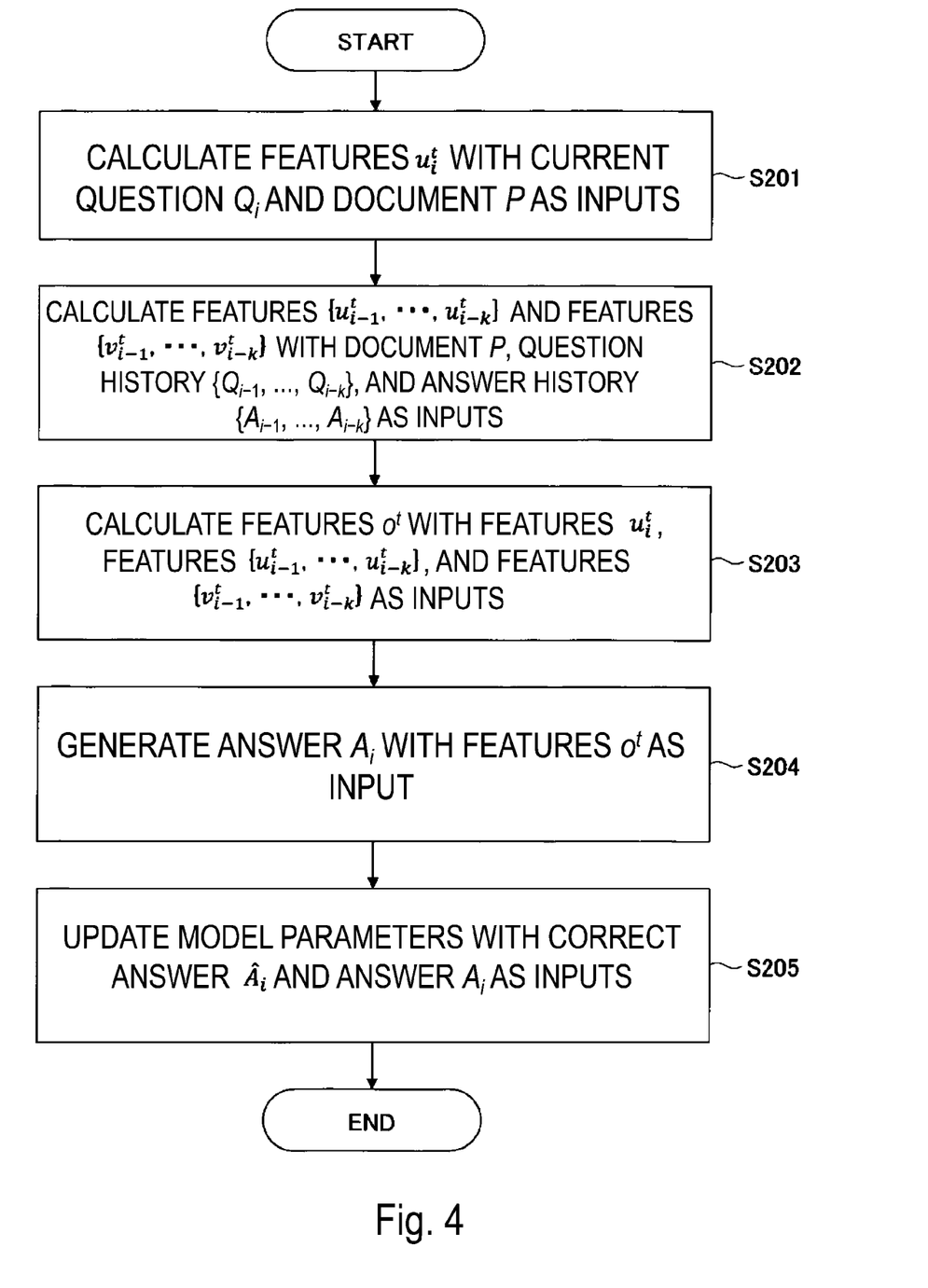
FIG. 4 it is a flowchart illustrating an example of a learning process according to the embodiment of the present invention.

In the following, a process of learning model parameters of neural networks that implement the functional units included in the dialogue processing unit 100 (the question encoding unit 110, the context encoding unit 120, the context combining unit 130, and the answer generation unit 140) (a learning process) will be described with reference to FIG. 4. FIG. 4 is a flowchart illustrating an example of the learning process according to the embodiment of the present invention.

Here, a dataset of learning data used for the learning process may include, for example, a dataset (QuAC) described in Reference 5 below.

Reference 5:

Eunsol Choi, He He, Mohit Iyyer, Mark Yatskar, Wentau Yih, Yejin Choi, Percy Liang, and Luke Zettlemoyer. 2018. QuAC: Question Answering in Context. In EMNLP. ArXiv: 1808.07036.

Each piece of learning data includes a current question $Q_i$, a document P, a question history $\{Q_{i-1}, ..., Q_{i-k}\}$, an answer history $\{A_{i-1}, ..., A_{i-k}\}$, and a correct answer $\hat{A}_i$. When the model of the neural network that implements the answer generation unit 140 is a model that generates the answer $A_i$ in an extractive mode, the correct answer $\hat{A}_i$ is expressed by a pair of start and end positions of a range corresponding to the correct answer in the document P. On the other hand, when the model of the neural network is a model that generates the answer $A_i$ in a generative mode, the correct answer $\hat{A}_i$ is expressed by one or more words representing the correct answer.

Steps S201 to S204 of FIG. 4 are repeatedly executed for each piece of learning data. These steps S201 to S204 are the same as steps S101 to S104 of FIG. 3 and thus description thereof will be omitted. However, the current question $Q_i$, the document P, the question history $\{Q_{i-1}, ..., Q_{i-k}\}$, and the answer history $\{A_{i-1}, ..., A_{i-k}\}$ used here are those included in each piece of lerning data. Further, the model parameters used here are unlearned ones.

Step S205: The update unit 200 takes the correct answer $\hat{A}_i$ and the answer $A_i$ generated by the dialogue processing unit 100 as inputs and updates the model parameters using a known supervised learning method. When the model of the neural network that implements the answer generation unit 140 is a model that generates the answer $A_i$ in an extractive mode, the update unit 200 calculates an error between the answer $A_i$ and the correct answer $\hat{A}_i$ using the start and end positions used when generating the answer $A_i$.

The above step S205 is executed, for example, for each mini-batch composed of a predetermined number of pieces of learning data.

In the above manner, the dialogue processing apparatus 10 according to the present embodiment can train the model parameters of the neural networks that implement the functional units included in the dialogue processing unit 100.

Experimental Results

Next, the results of an experiment performed using the dialogue processing apparatus 10 according to the present embodiment for comparison with the related art will be described. Datasets used were the following three extractive types of QuAC (datasets used for machine reading comprehension in an extractive mode).

Learning set: 81425 QAs
Development set: 7354 QAs
Test set: 7353 QAs

The learning set was used only for training the model parameters.

In the dialogue processing apparatus 10 according to the present embodiment, the question encoding unit 110 and the context encoding unit 120 were implemented by BERT and the answer generation unit 140 was implemented by a modeling layer and an output layer of BiDAF. The following were BERT setting conditions.

Maximum sequence length: 384 tokens
Slide width: 128 tokens
Maximum query (question) length: 64 tokens
Maximum answer length: 30 tokens
Fine-tuning: 2 epochs The maximum sequence length is a word length allowed to be input to the BERT. The slide width is used when inputting a word sequence having a length exceeding the maximum sequence length into the BERT. The word sequence is input to the BERT while sliding the word sequence by the slide width. In this experiment, the maximum sequence length is 384 tokens and the slide width is 128 tokens. Therefore, when a word sequence exceeding 384 tokens is input to the BERT, word sequences are input to the BERT such that the word sequences before and after the slide overlap partially.

Here, Table 1 below shows a comparison result of F-meaures (an F-measure when the development set was used and an F-measure when the test set was used) between the method of the related art described in Non Patent Document 1 (FlowQA) and the method of the dialogue processing apparatus 10 according to the present embodiment (the method of the present embodiment).

TABLE 1

| METHOD | F-MEASURE (DEVELOPMENT SET) | F-MEASURE (TEST SET) |
| --- | --- | --- |
| RELATED ART (FlowQA) | 64.6 | 64.1 |
| METHOD OF PRESENT EMBODIMENT | 65.4 | 64.9 |

As shown in the above comparison results, the method of the present embodiment has higher F-measures in both the development and test sets than the method of the related art. Thus, it can be seen that the method of the present embodiment can generate an appropriate answer with higher accuracy than the method of the related art.

Hardware Configuration of Dialogue Processing Apparatus 10

Figure 5:
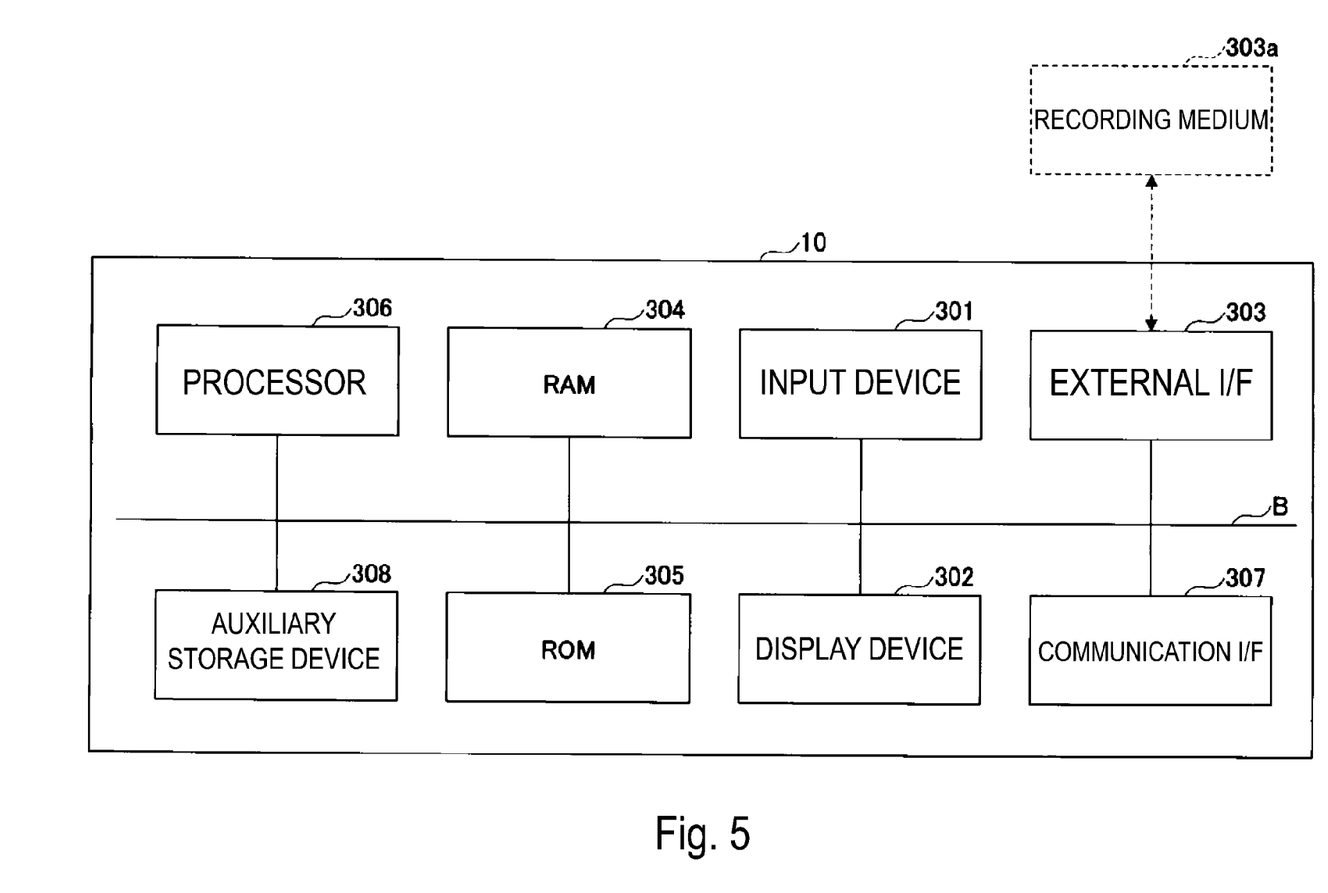
FIG. 5 is a diagram illustrating an example of a hardware composition of the dialogue processing apparatus according to the embodiment of the present invention.

Finally, a hardware configuration of the dialogue processing apparatus 10 according to the present embodiment will be described with reference to FIG. 5. FIG. 5 is a diagram illustrating an example of the hardware configuration of the dialogue processing apparatus 10 according to the embodiment of the present invention.

As illustrated in FIG. 5, the dialogue processing apparatus 10 according to the present embodiment includes, as hardware components, an input device 301, a display device 302, an external I/F 303, a random access memory (RAM) 304, a read only memory (ROM) 305, a processor 306, a communication I/F 307, and an auxiliary storage device 308. These hardware components are communicably connected to each other via a bus B.

The input device 301 is, for example, a keyboard, a mouse, or a touch panel. The display device 302 is, for example, a display. The dialogue processing apparatus 10 may not include at least one of the input device 301 and the display device 302.

The external I/F 303 is an interface with an external device. The external device includes a recording medium 303a and the like. The dialogue processing apparatus 10 can perform reading and writing from and to the recording medium 303a or the like via the external I/F 303. Examples of the recording medium 303a include a compact disc (CD), a digital versatile disc (DVD), a secure digital (SD) memory card, and a universal serial bus (USB) memory card. The recording medium 303a may record one or more programs that implement each functional unit included in the dialogue processing apparatus 10 (for example, the dialogue processing unit 100 and the update unit 200).

The RAM 304 is a volatile semiconductor memory that temporarily holds programs and data. The ROM 305 is a non-volatile semiconductor memory that can hold programs and data even when power is off.

The processor 306 is an arithmetic unit such as a central processing unit (CPU) or a graphics processing unit (GPU) and reads a program or data from the ROM 305 or the auxiliary storage device 308 and loads the program or data to the RAM 304 to execute processing. Each functional unit included in the dialogue processing apparatus 10 is implemented, for example, by a process of causing the processor 306 to execute one or more programs stored in the auxiliary storage device 308. The dialogue processing apparatus 10 may include both the CPU and the GPU as the processor 306 or may include only one of the CPU and the GPU.

The communication I/F 307 is an interface for connecting the dialogue processing apparatus 10 to a communication network. One or more programs that implement each functional unit included in the dialogue processing apparatus 10 may be acquired (downloaded) from a predetermined server device or the like via the communication I/F 307.

The auxiliary storage device 308 is, for example, a hard disk drive (HDD) or a solid state drive (SSD) and is a non-volatile storage device that stores programs and data. The programs and data stored in the auxiliary storage device 308 include, for example, an OS and one or more programs that implement each functional unit included in the dialogue processing apparatus 10.

The dialogue processing apparatus 10 according to the present embodiment can realize the dialogue process and the learning process described above by having the hardware configuration illustrated in FIG. 5. The example illustrated in FIG. 5 has been described with reference to the case where the dialogue processing apparatus 10 according to the present embodiment is implemented by one device (computer), but the present invention is not limited to this. The dialogue processing apparatus 10 according to the present embodiment may be implemented by a plurality of devices (computers). One device (computer) may include a plurality of processors 306 and a plurality of memories (such as the RAM 304, the ROM 305, and the auxiliary storage device 308).

The present invention is not limited to the above embodiment disclosed in detail and various changes and modifications can be made without departing from the description of the scope of claims.

REFERENCE SIGNS LIST
  10 Dialogue Processing Apparatus
  100 Dialogue processing unit
  110 Question encoding unit
  120 Context encoding unit
  130 Context combining unit
  140 Answer generation unit
  200 Update unit

The invention claimed is:

1. A dialogue processing apparatus, comprising:
a storage; and
a hardware processor configured to:
  take a question $Q_i$ that is a word sequence representing a current question in a dialogue, a document P used to generate an answer $A_i$ to the question $Q_i$, a question history $\{Q_{i-1}, \ldots, Q_{i-k}\}$ that is a set of word sequences representing k past questions, and an answer history $\{A_{i-1}, \ldots, A_{i-k}\}$ that is a set of word sequences representing answers to the k questions as inputs; and
  generate the answer $A_i$ by machine reading comprehension in an extractive mode or a generative mode using pre-trained model parameters.

2. The dialogue processing apparatus according to claim 1, wherein features used to generate the answer $A_i$ by machine reading comprehension in the extractive mode or the generative mode are characterized in that the number of the features reflecting the question $Q_i$ the question history $\{Q_{i-1}, \ldots, Q_{i-k}\}$, and the answer history $\{A_{i-1}, \ldots, A_{i-k}\}$, is defined as T, and
  the hardware processor is configured to calculate features $\{u_{i-1}^t, \ldots, u_{i-k}^t\}$ (where t=1, ..., T) of the document P regarding the question history $\{Q_{i-1}, \ldots, Q_{i-k}\}$ and features $\{v_{i-1}^t, \ldots, v_{i-k}^t\}$ (where t=1, ..., T) of the document P regarding the answer history $\{A_{i-1}, \ldots, A_{i-k}\}$.

3. The dialogue processing apparatus according to claim 2, wherein the harware processor is configured to:
  calculate features $u_i^t$ (where t=1, ..., T) of the document P regarding the question $Q_i$;
  combine, for each t, the features $u_i^t$ (where t=1, ..., T), the features $\{u_{i-1}^t, \ldots, u_{i-k}^t\}$ (where t=1, ..., T), and the features $\{v_{i-1}^t, \ldots, v_{i-k}^t\}$ (where t=1, ..., T) to calculate features $o^t$ (where t=1, ..., T) as the features reflecting the question $Q_i$ the question history $\{Q_{i-1}, \ldots, Q_{i-k}\}$, and the answer history $\{A_{i-1}, \ldots, A_{i-k}\}$; and
  generate the answer $A_i$ by the machine reading comprehension in the extractive mode or the generative mode using the features $o^t$ (where t=1, ..., T).

4. A non-transitory computer-readable recording medium having stored threin a program for causing a computer to operate as the dialogue processing apparatus according to claim 1.

5. A learning apparatus comprising:
a storege; and
a hardware processor is configured to:
  take a question $Q_i$ that is a word sequence representing a current question in a dialogue, a document P used to generate an answer $A_i$ to the question $Q_i$, a question history $\{Q_{i-1}, \ldots, Q_{i-k}\}$ that is a set of word sequences representing k past questions, and an answer history $\{A_{i-1}, \ldots, A_{i-k}\}$ that is a set of word sequences representing answers to the k questions as inputs, and to generate the answer $A_i$ by machine reading comprehension in an extractive mode or a generative mode using model parameters; and
  update the model parameters by supervised learning using the answer $A_i$ and a correct answer to the question $Q_i$.

6. A non-transitory computer-readable recording medium having stored therein a program for causing a computer to operate as the learning apparatus according to claim 5.

7. A dialogue processing method configured to be executed by a computer, the method comprising:
  taking a question $Q_i$ that is a word sequence representing a current question in a dialogue, a document P used to generate an answer $A_i$ to the question $Q_i$, a question history $\{Q_{i-1}, \ldots, Q_{i-k}\}$ that is a set of word sequences representing k past questions, and an answer history $\{A_{i-1}, \ldots, A_{i-k}\}$ that is a set of word sequences representing answers to the k questions as inputs, and
  generating the answer $A_i$ by machine reading comprehension in an extractive mode or a generative mode using pre-trained model parameters.

* * * * *